(12) United States Patent
Erickson et al.

(10) Patent No.: US 7,398,690 B1
(45) Date of Patent: Jul. 15, 2008

(54) ACOUSTIC PRESSURE SENSOR

(75) Inventors: David J. Erickson, Liverpool, NY (US); Walter Chyrywaty, III, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 11/400,688

(22) Filed: Apr. 7, 2006

(51) Int. Cl.
*G01L 11/00* (2006.01)
(52) U.S. Cl. .......................................... 73/702
(58) Field of Classification Search .................... 73/702
See application file for complete search history.

(56) References Cited

U.S. PATENT DOCUMENTS 4,299,117 A * 11/1981 Andrews et al. ........... 73/35.11
5,222,049 A * 6/1993 Drumheller .................. 367/82
6,634,227 B1 * 10/2003 Rutz et al. ................ 73/290 R

* cited by examiner

*Primary Examiner*—Edward Lefkowitz
*Assistant Examiner*—Jermaine Jenkins
(74) *Attorney, Agent, or Firm*—Howard IP Law Group PC

(57) ABSTRACT

An acoustic pressure sensor includes a stack of one or more acoustically responsive elements which are contained within a housing. An external acoustic pressure to be sensed is transmitted to the stack via a diaphragm which exists in an end cap closing a top portion of the housing. The outer edge of the diaphragm is in direct contact with the outer edge of the housing. This area enhancement increases the basic sensitivity of the sensing stack without the need of a gap. The diaphragm allows flexure to occur in a controlled fashion. The housing is sealed at the top and bottom by end caps, the top end cap defining a diaphragm area, which diaphragm deflects to thereby apply pressure to the stack to convert acoustic signals into electrical signals.

38 Claims, 7 Drawing Sheets

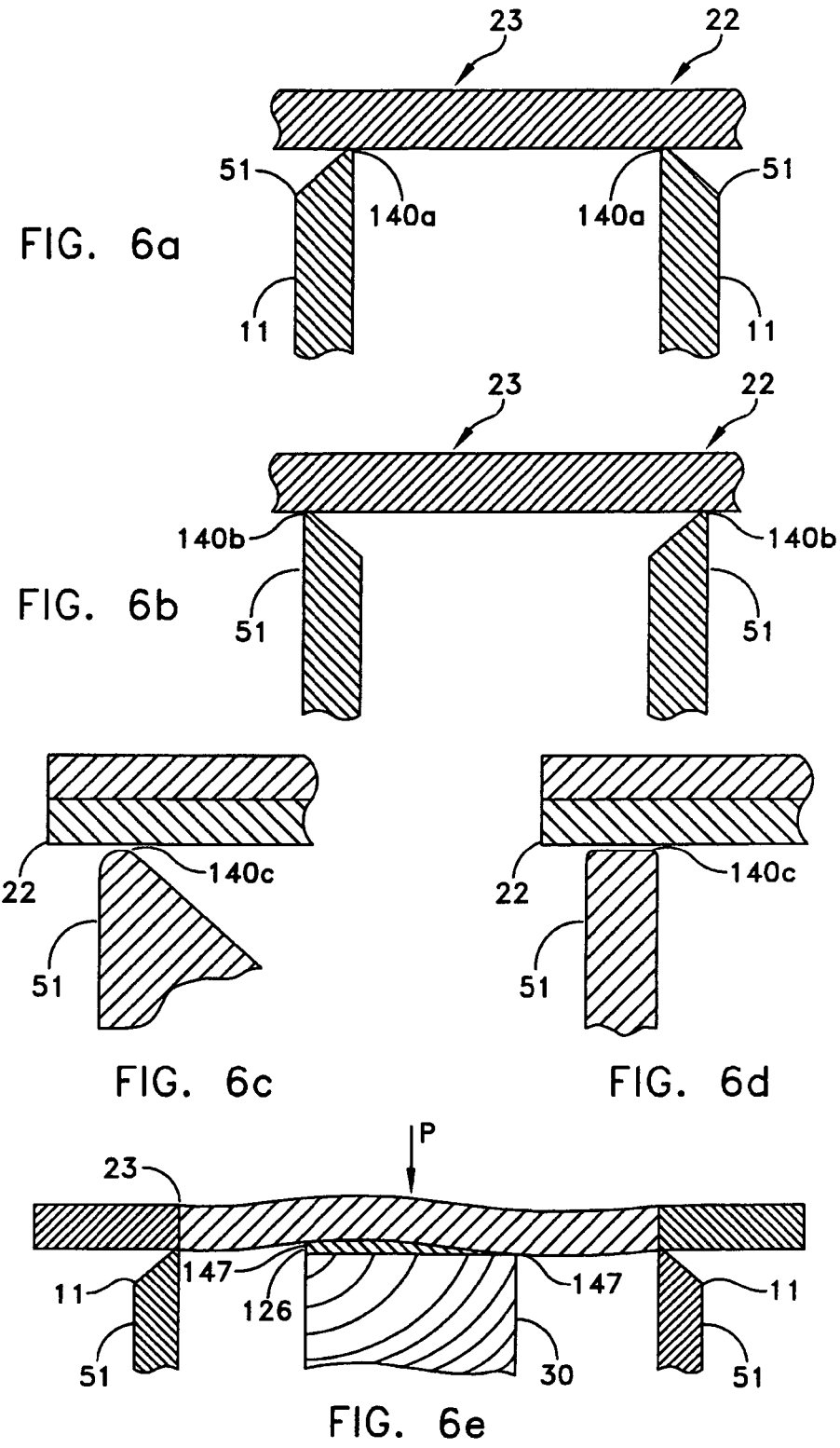

ACOUSTIC PRESSURE SENSOR

FIELD OF THE INVENTION

The invention relates to an acoustic pressure sensor and more particularly to such sensors for use as hydrophones or other devices.

BACKGROUND OF THE INVENTION

Hydrophones are underwater acoustic sensors which most commonly employ piezoelectric technology. The hydrophone typically converts acoustic energy into electrical energy. Such devices have widespread use such as in fixed ground water sites, surface and subsurface platforms, sonobuoys, decoys, geophysical exploration, military applications such as submarine detection sweep and anti mine operations, and target simulators. Such hydrophone sensors as indicated provide a conversion between acoustical energy and electrical energy. These sensors often operate as passive listening devices for subsurface target detection and tracking. Over the years, there have been substantial improvements in the design and operation of these devices at lower frequencies and under more adverse conditions. Certain prior art devices require a linkage between the electro-acoustical performance parameters such as sensitivity and element capacity and the geometrically determined pressure amplification. Such prior art devices often utilize cylindrical elements and certain devices require a gap between the housing and the head mass. This gap creates problems in sealing and further results in head flexure. Accordingly, there is still a need to manufacture a reliable, rugged device that is capable of producing electrical energy from acoustic energy at relatively low levels and at low frequencies. A more sensitive, reliable and rugged hydrophone transducer which employs a mechanical housing and a coupling technique for the transducer that addresses one or more of the aforementioned problems is desirable.

SUMMARY OF THE INVENTION

An acoustic pressure sensor includes one or more acoustically responsive elements which are contained within a housing. An external acoustic pressure to be sensed is transmitted to the one or more elements via a diaphragm which exists in an end cap closing a top portion of the housing. An outer edge of the diaphragm is in direct contact with an outer edge of the housing. This area enhancement increases the basic sensitivity of the sensing stack without the need of a gap. The diaphragm allows flexure to occur in a controlled fashion.

The housing is sealed at the top and bottom by end caps, the top end cap defining a diaphragm area, which diaphragm deflects to thereby apply pressure to the stack to convert acoustic signals into electrical signals.

In yet another aspect of the invention the acoustically responsive elements comprise one or more sectionalized vibratory elements such as a stack of piezoelectrically active ceramic elements or discs in contact with the diaphragm. The sensitivity of the stack is proportional to the surface area of the diaphragm in relation to the contacted surface area of the ceramic discs.

In still another aspect of the invention, the outer edge of the diaphragm is in direct contact with the piezoelectrically active ceramic elements but allowed to rotate without mechanical resistance to motion.

In still another aspect of the invention the outer cover of the housing serves to seal the housing as well as serve as the diaphragm that interfaces with the vibratory elements.

In still another aspect of the invention the diaphragm eliminates a gap between the outer cover of the housing and the vibratory elements, by providing an axially located insulated rod to close any substantial gap between the diaphragm and the vibratory elements.

BRIEF DESCRIPTION OF THE FIGURES

FIG. 6a is a partial cross-sectional view of a sensor housing showing the flexible diaphragm and end cover and nodal points in accordance with an embodiment of the present invention.

FIG. 6b is a partial cross-sectional view of a sensor housing showing the flexible diaphragm and nodal points in accordance with another embodiment of the present invention.

FIG. 6c is a partial cross-sectional view of a sensor housing showing the flexible diaphragm and nodal points in accordance with another embodiment of the present invention.

FIG. 6d is a partial cross-sectional view of a sensor housing showing the flexible diaphragm and nodal points in accordance with another embodiment of the present invention.

FIG. 6e is a partial cross-sectional view of a sensor housing showing the flexible diaphragm and nodal points employed in conjunction with the transducer element in accordance with an embodiment of the present invention.

DETAILED DESCRIPTION OF PREFERRED EMBODIMENTS OF THE INVENTION

Figure 1:
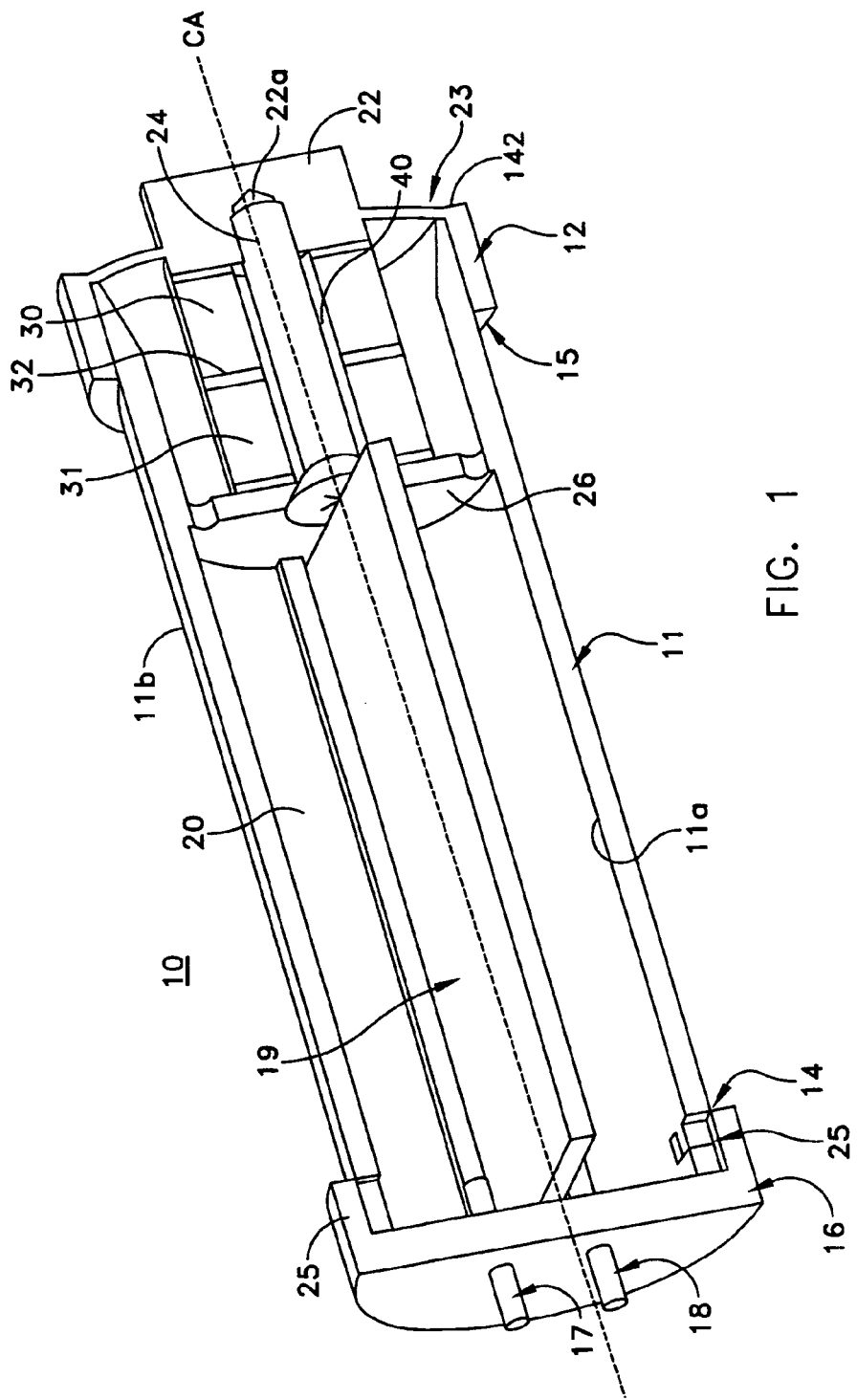
FIG. 1 illustrates a perspective drawing of a sectional side view of an electro acoustical sensor in accordance with an embodiment of the present invention.

Referring to FIG. 1, there is shown an exemplary embodiment of an electro acoustical sensor 10 configured as a hydrophone receiver. The sensor 10 has a housing 11 typically fabricated from a suitable metal such as titanium.

Housing 11 as shown in FIG. 1 has an internal hollow 20, the internal hollow containing one or more acoustically responsive elements (30, 31). The one or more acoustically responsive elements are capable of vibratory motion and may comprise, for example, one or more piezoelectric or piezoresistive elements, which elements convert acoustic energy into electrical energy. Elements 30 and 31 may be arranged in a stack configuration and operatively coupled with a flexible diaphragm structure comprising a peripheral end cap 22 positioned at a first end of the sensor 10. The end cap is integrally or monolithically formed with diaphragm 23, which end cap 22 as seen surrounds the end of housing 11 via end segment flange 12. The housing 11 as shown in FIG. 1 is symmetrically disposed about the central axis designated as CA. The end cap 22 provides a completely sealed housing for the stack of the piezoelectric active elements 30 and 31, which are positioned longitudinally along the central axis of the housing. A bottom end cap 16 is positioned at a second end of the sensor structure opposite the first end. The bottom end cap 16 also has flange portions 25, which firmly close and seal the end of the sensor 10.

Posts 17 and 18 are electrical conductive posts or leads which are in turn coupled to signal conditioning circuitry 19. The signal conditioning circuitry 19 receives the signals from the piezoelectric elements 30, 31 and provides appropriate pre-amplification, signal processing and vibratory signal conditioning and/or telemetry data. The signal conditioning circuitry may be mounted on one or more printed circuit boards (PCBs).

The configuration shown in FIG. 1 is a perspective view wherein the housing 11 is essentially a longitudinal tubular member and circular in cross-section. The end caps 22 and 16 are also substantially circular in cross-section. The peripheral end cap 22 has flanges 12 which are secured to the ends of the housing. The end cap 22 is fixed and secured (e.g. welded) to the housing about the periphery as depicted by reference numeral 15. The bottom end cap 16 is also fixed and secured (e.g. welded) to the housing about the periphery as depicted by reference numeral 14. The end cap 22 has a central boss area 22a, which boss area is integrally formed with the flexible membrane area or diaphragm 23. It is understood that the end cap 22 may be secured by mechanical pressure means to the housing, such that under sufficient forces the end cap 22 is sealed with the housing structure.

Still referring to FIG. 1, a moveable rod member 24 such as a screw is located within the aperture formed by the annular stack of piezoelectric elements 30 and 31. Also seen in FIG. 1, the housing 11 has an inner partition wall 26 which separates the piezoelectric stacks 30 and 31 from the signal conditioning circuitry portion of the sensor. The screw extends into the central boss 22a of the end cap 22 and enables one to completely eliminate the gap which exists in prior art devices between the housing and the head mass, thereby eliminating problems in sealing and further problems in head flexure. End cap 22 is a semi-rigid structure operatively and integrally coupled to flexible diaphragm 23. This arrangement enables mechanical amplification of external signal pressures and therefore increases the acoustic sensitivity of the sensor.

The configuration depicted in FIG. 1 separates to a large extent the usual linkage between the electro acoustical performance parameters such as sensitivity and element capacity and the geometrically determined pressure amplification. The sensor of FIG. 1 further eliminates the problems associated with prior art devices having gaps between the housing and the head mass.

The flexural diaphragm 23 is in intimate contact with the centrally located stack of vibratory elements as well as in contact with the periphery of the housing 11. The end cap may be circular in form and presents a low stiffness to the stack. The end cap should preferably be of sufficient strength to withstand large values of external hydrostatic pressure (e.g. on the order of greater than 1000 pounds per square inch).

Figure 2:
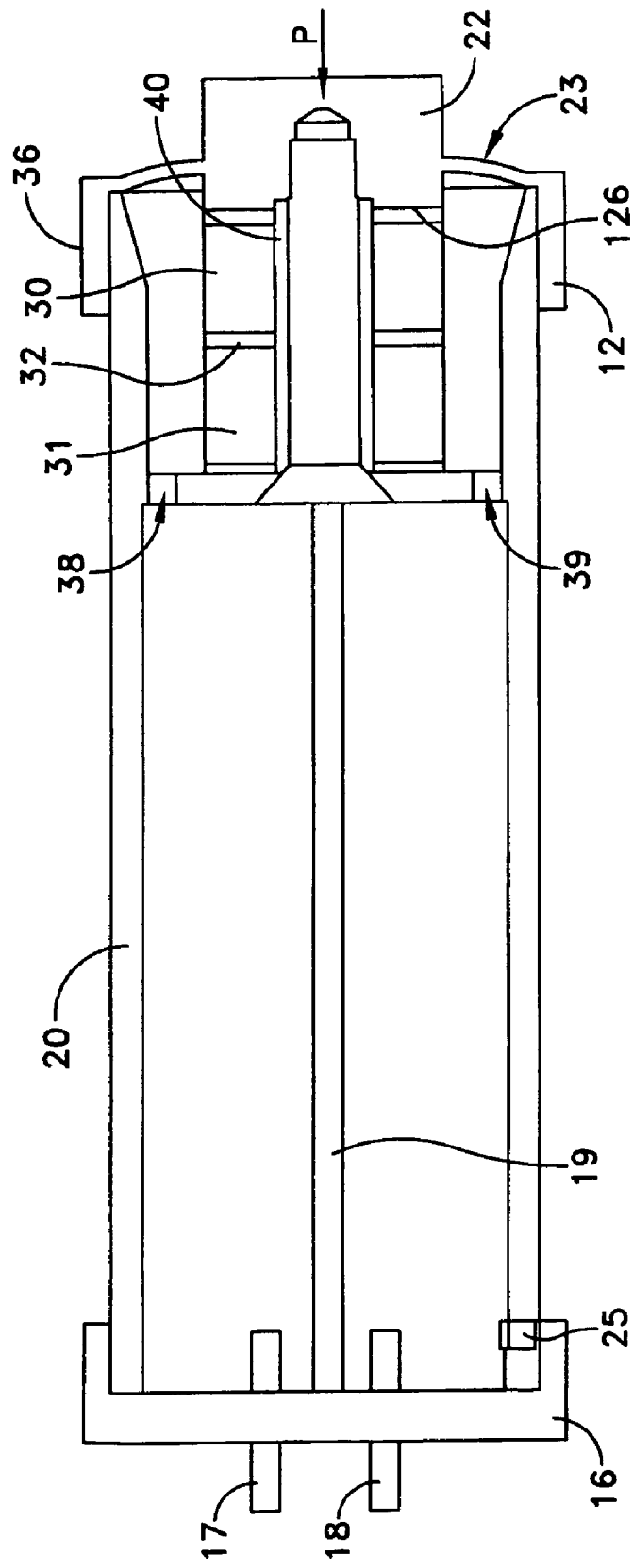
FIG. 2 is a cross-sectional side view of the sensor depicted in FIG. 1.
Figure 5:
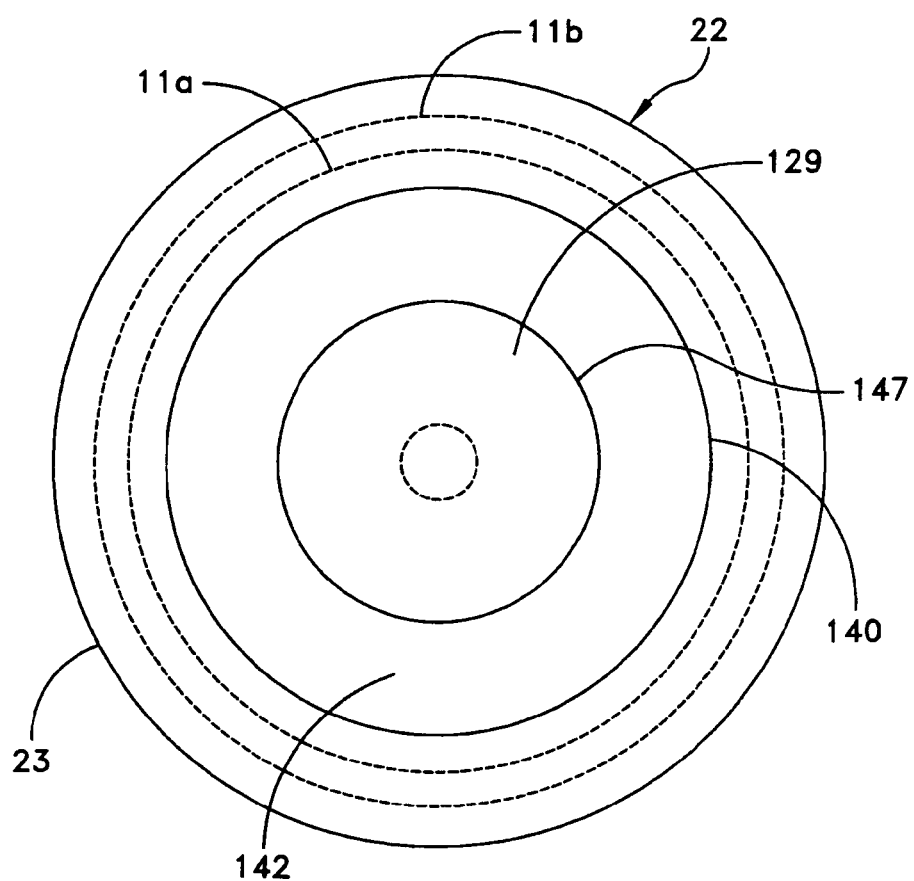
FIG. 5 illustrates a schematic top view of the end cap showing the flexible diaphragm and flexure area in accordance with an embodiment of the present invention.

In one configuration, diaphragm 23 is joined integrally or monolithically to the end cap 22. The embodiments illustrated in FIG. 2 and FIG. 5 show by way of example and not limitation, the diaphragm 23 as generally circular in shape. However, other shaped diaphragms may be employed as a design choice for optimal performance such as the manner of increasing the sensitivity of the sensing material based upon its mechanical association to the diaphragm 23. In general, diaphragm 23 may be looked upon as a membrane, which supports an applied pressure that causes a deflection in the portion of the diaphragm 23 unsupported by the vibratory elements. In this manner the forces applied to the unsupported portion results in an increased force applied to the vibratory element(s) positioned along the central axis of the housing. The physical dimensions of the diaphragm are optimally chosen to have a thickness and diameter adapted to produce vibrations between about 20 Hz and 20 KHz. For a given acoustic pressure the diaphragm deflection depends upon its material properties and its geometry, such as Young's Modulus stiffness, its geometric shape, such as its cross section configuration, and boundary conditions, such as the relationship between the flexure area 142 (see FIG. 5) and the balance of the diaphragm 23. For example, the greater the stiffness of the diaphragm, the greater the required pressure to induce a deflection. In a corresponding manner the cross section of the diaphragm 23 may be designed as having a substantially uniform cross section. The flexure area may be varied in cross section, to optimize performance of the energy transfer between the diaphragm and the sensing material based upon mass, modulus and stiffness, its geometric shape and boundary conditions.

In an exemplary configuration, the stiffness of the diaphragm is substantially less than the corresponding stiffness of both the peripheral portion of the housing and that of the vibratory element(s) (e.g. on the order of equal to or greater than one hundred to one.) It is understood, however, that a relative stiffness less than the above identified values may be also be utilized depending on the application.

The housing configuration depicted in FIG. 1 permits independent selection of the plate material (which is preferably titanium) as well as the piezoelectric stack parameters regarding numbers of elements, sizes, and materials. The configuration results in an improved sensor, which presents minimal design compromises and is much less expensive than prior art devices.

By utilizing this design one broadens the field of applications of the sensor, whereby the device can be used in the area of conformal acoustic sensor arrays for use in both in water and in gaseous acoustic media. The flexural area which is manifested by the end cap 22 integrally coupled with diaphragm 23 can be chosen independently of the active material. Therefore, such devices can also be employed for various operations or in hazardous conditions.

Referring now to FIG. 2, there is shown a cross-sectional side view of the sensor depicted in FIG. 1. In order to more clearly understand the nature of the invention, similar reference numerals employed in FIG. 1 have been repeated in FIG. 2 for ease of explanation.

From FIG. 2 it understood that the stack of vibratory elements 30 and 31 form a plurality of sectionalized vibratory elements such as piezoelectrically active ceramic discs. It is understood that the present invention may be implemented using a single ceramic disk operating as a vibratory element. The discs are completely contained within the metallic housing 11. The external acoustic pressure designated by the arrow label P, to be sensed is mechanically transmitted to the sensing stacks (30, 31) via the diaphragm 23 of end cap 22. The outer edge of the diaphragm portion which is depicted by reference numerals 36 and 12, is mechanically in direct contact with the outer edge of the housing 11. More particularly, when a force or pressure is applied to boss section 22a of the end cap 22, the diaphragm 23 flexes or vibrates, transmitting the pressure to the piezoelectric stacks 30 and 31. The resulting flexural area enhancement of the diaphragm increases the basic sensitivity of the one or more sensing stacks (30 and 31) without the need of a gap.

The diaphragm 23 is designed to allow flexure to occur in a controlled fashion. While certain sensor designs utilize a rigid head mass approach to provide the area transformation function, such designs suffer from various problems, including the need for a gap to be incorporated to prevent restriction of motion. The device depicted in FIG. 2 eliminates the need for a gap and provides a completely sealed, extremely rugged unit. The sensor 10 is ideally suited to harsh conditions as found, for example, in ocean waters.

In the exemplary configuration of FIG. 1, the stacks are separated by an insulator 32. On both sides of each insulator 32 (see also FIG. 3) is a foil annulus 222 that essentially enables one to electrically contact the piezoelectric stacks. Appropriate electrical connections are also provided between signal conditions circuit board 19 and elements 30, 31 as is understood by one skilled in the art. As previously discussed, the stack may be formed from one or more piezo sensing materials, including ceramic piezoelectric sensing materials, and preferably disc like ceramic piezoelectric elements.

The stack of elements 30 and 31 surround the threaded screw member 24 and essentially are separated as indicated by the insulator layer 32. Also shown in FIG. 2 are twisted pair feed through wire assemblies 38 and 39. These twisted pairs enable electrical contact to be made from the piezoelectric elements 30 and 31 to the signal conditioner circuitry.

Referring now to FIG. 2 in conjunction with FIG. 5, the acoustic pressure field couples through the diaphragm 23 to the vibratory elements 30, 31 at surface contact 126 between the elements and the circular diaphragm. In response to an applied pressure P, the diaphragm 23 flexes in proportion to the pressure field and transfers a proportional mechanical pressure to the piezo sensors. More particularly, the application of the transfer of the proportional mechanical pressure to the piezo sensors occurs through the deflection of flexure area 142 (FIG. 5) integral to the circular diaphragm 23. The flexure area has a circumferential node, which contacts the housing along a circumference 140 (FIG. 5). The inner and outer portions of the housing are indicated by reference numerals 11*a* and 11*b*, respectively. The flexure area integrally connects along a circumference 147 to the central portion 129 of end cap 22 that also serves as the diaphragm 23. It is understood that the central portion 129 is supported by the stack (30, 31) along surface 126, with the unsupported flexure area identified as 142. The placement of the flexure nodes 140, 147 determines the surface area of the flexure 142. It will be recognized that the flexure area comprises a substantially circular flexural membrane in the form of an annulus. The thickness of the overall diaphragm 23 and/or flexure area 142 may be tailored according to the particular application, including the desired sensitivity, durability, size, and/or power requirements, with particular materials chosen having the desirable modulus and corresponding placement of the flexure nodes 140, 147 relative to the diaphragm generally to achieve various vibrational modes consistent with circular membranes.

In another aspect of the invention an outer edge of the diaphragm is in direct contact with the sensing material, but is allowed to rotate without mechanical resistance to motion. The diaphragm 23 eliminates a gap between the outer cover and the sensing material, by placing the diaphragm in direct contact with the material.

Figure 3:
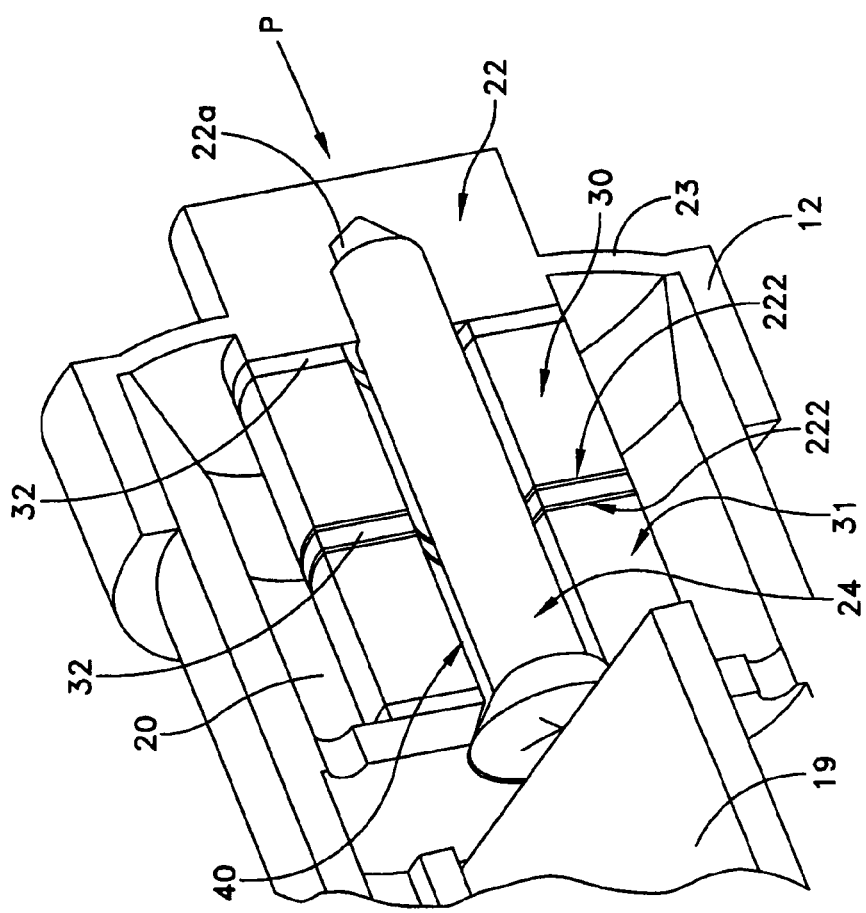
FIG. 3 is a perspective view of the top portion of the sensor depicting the piezoelectric elements as well as the end cap.

Referring to FIG. 3, there is shown a perspective view of an embodiment of housing 11 having the end cap 22 secured thereto with the end cap having the flexible diaphragm portion 23 and the central boss 22*a*. The screw 24 with threaded draw member is positioned within the aperture 40 and the threaded screw can be tightened in conjunction with the boss 22*a* to eliminate the gap between the stack of piezoelectric elements 30 and 31, and the pressure applying surfaces.

Figure 4:
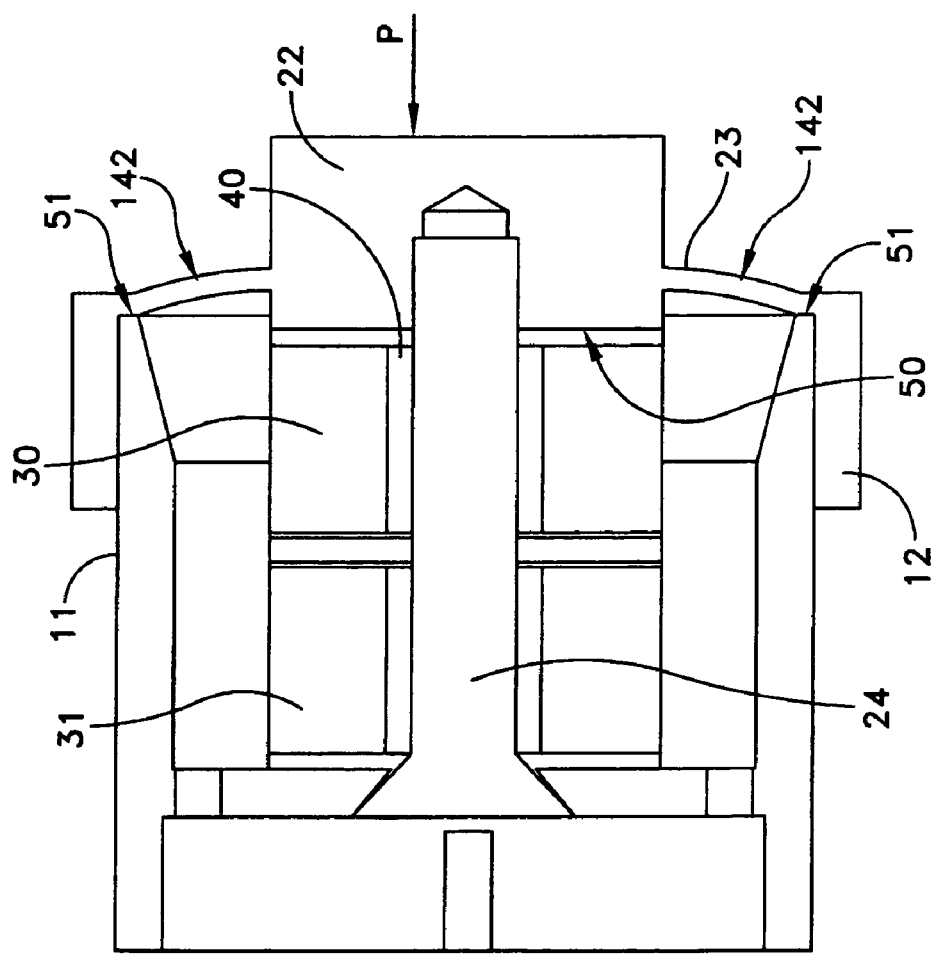
FIG. 4 is cross-sectional view of the end cap employed in conjunction with the transducer in accordance with an embodiment of the present invention.

Referring now to FIG. 4, there is shown a similar representation as depicted in FIG. 3 but as a side view. The same reference numerals have again been utilized to describe similar components. As seen in FIG. 4, reference numeral 50 depicts the region where a gap would otherwise exist between the end cap and the insulator. The gap that would be provided is removed by torquing the screw 24. Reference numeral 51 depicts the direct coupling between the housing 11 and the end cap at the periphery of the housing. Also shown is the flexural area 142 of diaphragm 23. Operation is enabled by the flexural diaphragm section 23, the outer edge of which is in direct contact with the outer edge of the housing, as indicated by reference numeral 51. The resulting area enhancement increases the basic sensitivity of the sensing stack without the need of a gap. As previously identified, the gap is eliminated by advancing the screw 24 into the boss section 22*a* of the end cap 22.

Performance of the diaphragm 23 in part depends upon its geometric shape and form, as for example, whether it is cylindrical or some other solid geometric shape. For example, the diaphragm 23 upper and lower surfaces may take the form of a conic section or a polygon. By way of a non-limiting example such configuration may include: a circular, elliptical, triangular, rectangular or hexagonal shaped diaphragm. Additionally as indicated, the performance of the invention as a transducer for the intended purpose will depend upon the materials from which it is constructed. The diaphragm 23 material therefore may be also chosen from any family of metals or polymers chosen for suitable material properties, such as modulus, density or strength. However, other performance characteristics will depend upon the selection of a nodal style according to the manner in which the diaphragm 23 contacts, as for example, the outer edge of the housing at reference numeral 51.

FIGS. 6*a* through 6*d* illustrate partial cross-sectional views of embodiments illustrating contacting the diaphragm 23 to the housing 11 in accordance with aspects of the present invention. For clarity, the one or more vibrating elements 30, 31 operatively coupled with the flexible diaphragm 23 are not shown in FIG. 6*a* through FIG. 6*d*. In FIG. 6*a*, a node 140*a*, having an outside beveled edge formed as a sharp knife edge terminating at an apex, which is the point of contact between the inner surface of substantially planar diaphragm 23 (integral with the end cap 22) and the outer edge of the housing 11 at reference numeral 51. As shown in FIG. 6*b* a node 140*b* having an inside beveled edge whose apex is the point of contact between the integral diaphragm 23 and the outer edge of the housing 11 at reference numeral 51. FIG. 6*c* illustrates a curved outer edge of housing 11 contacting the inner surface of diaphragm 23 at node 140*c*, while FIG. 6D shows a substantially planar outer edge of the housing in contact engagement with the inner surface of planar diaphragm 23 along node 140*d*.

In FIG. 6*e* the diaphragm 23 is shown interfaced to a stack of one piezoelectric element 30. For clarity, the threaded screw member 24 is not shown. The external acoustic pressure designated by the arrow label P, to be sensed, is mechanically transmitted to the sensing stack via the diaphragm portion 23, shown in a flexed state (exaggerated for emphasis). The flexure area of diaphragm 23 integrally connects along a circumference 147. The placement of the flexure nodes 147 and the nodes 140a, 140b, 140c or 140d determine the surface area of the flexure.

Figure 7A:
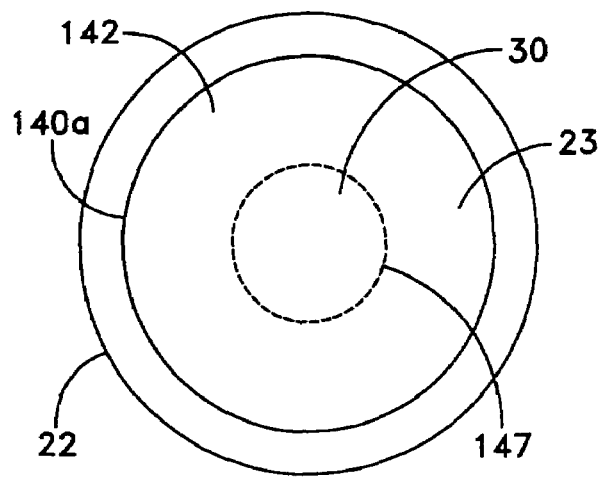
FIG. 7a illustrates a schematic top view of the integral end cap and flexible diaphragm in accordance with an embodiment of the present invention.

FIG. 7a illustrates a schematic top view of the integral end cap 22 and flexible diaphragm 23 in accordance with an embodiment of the present invention. The view shows the contact as a knife edged contact node 140a minimally contacting the diaphragm 23 along the projection of the circle and the node 147 as established by contact with the vibratory element 30.

Figure 7B:
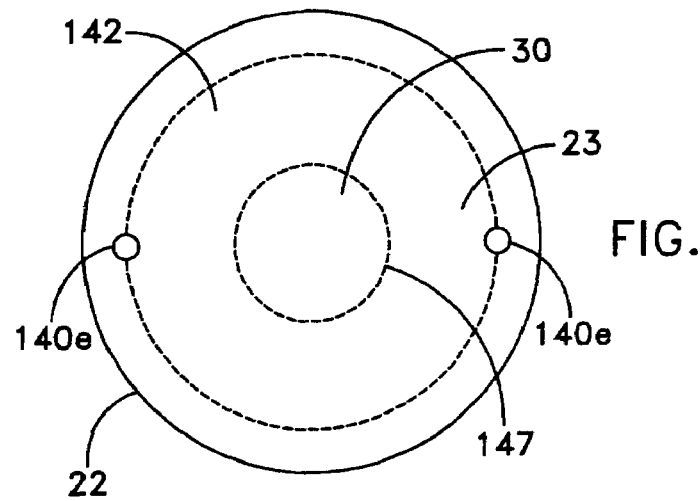
FIG. 7b illustrates a schematic top view of the integral end cap and flexible diaphragm in accordance with another embodiment of the present invention.

FIG. 7b shows yet another embodiment of the nodal style wherein the nodal points 140e and nodal point 147 serve to contact the diaphragm 23. In this instance, the contact is a point contact node 140e minimally contacting the diaphragm 23 at two or more points along the projection of the circle defined by the length of the diameter established by the distance between the two nodes 140e and node 147 as established by contact with the vibratory element 30. Although two nodal points are illustrated In FIG. 7b, the invention encompasses embodiments comprising a plurality of nodal points to that serve as multiple points of contact.

Figure 7C:
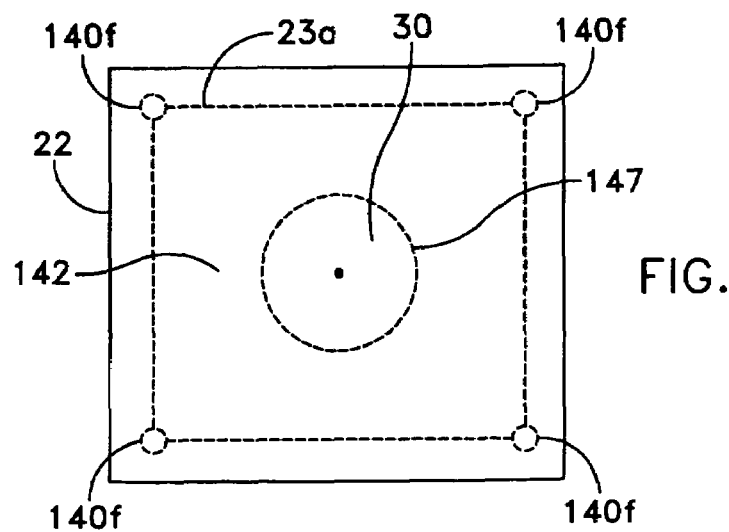
FIG. 7c illustrates a schematic top view of the integral end cap and flexible diaphragm in accordance with another embodiment of the present invention.

FIG. 7c shows yet another embodiment of the nodal style wherein the nodal points 140f and nodal point 147 serve to contact the diaphragm 23. In this instance, the contact is one or mode contact nodes 140f contacting the diaphragm 23 at two or more points and node 147 as established by contact with the transducer 30. FIG. 7c serves as a non-limiting example of a non-circular diaphragm having associated nodal contact points.

The principles of the present invention have been described with reference to cylindrical members with circular cross-sectional end caps. While the cylindrical configuration is simple to implement, it is understood by one skilled in the art that other shaped configurations can be utilized as well. Of course it is also understood that the physical dimensions of the diaphragm area are chosen in regard to the thickness in diameter so that the unit can produce vibrations between about 20 Hertz (Hz) and 20 Kilohertz (KHz). It is further understood that for a given acoustic pressure the diaphragm deflection depends on its material properties. These include the mass, the modulus of the material and the stiffness. Further, various modifications can be made to the geometrical shape of the diaphragm, such as changing its cross-section configuration, for example.

Thus, the flexible diaphragm 23 as embodied in the present invention is capable of propagating an acoustic pressure and includes a flexure to transfer a propagated acoustic pressure to the piezoelectric sensing material. The electromechanical response of the piezoelectric sensor material is dependent upon a difference in contact area between the piezoelectric sensor surface area in contact with the diaphragm and the diaphragm total surface area. By increasing the ratio of the surface area of the diaphragm to piezoelectric sensor end surface area with which it is in contact, a gain in the ratio of the acoustic pressure field input to electrical signal output of the piezoelectric sensor material is achieved. The flexure connected to the diaphragm provides for the aforementioned gain and allows for a simple and rugged structure, especially for deep gap applications. By eliminating the gap a completely sealed transducer structure as embodied by the housing is achieved, obviating the need for additional rubber seals as found in some of the prior art.

While the above identified invention has been described, it should be understood that one skilled in the art may make various modifications without departing from the nature of this invention. Such modifications, for example as indicated above may be changes in geometrical shapes as well as changes in materials and changes in other coupling means to provide a device which is economical to fabricate, is rugged, highly sensitive and adapted to high volume production. Further, while the present invention has been described mainly in terms of a hydrophone receiver, it is contemplated that the present invention may also be utilized as a projector. Any and all such variations are covered by the appended claims.

The invention claimed is:

1. An acoustic transducer apparatus comprising:
a housing having an opening at one end and one or more acoustically responsive elements positioned longitudinally along a central axis of the housing;
a diaphragm sensitive to an applied acoustic pressure and in contact with said housing at an outermost portion of the housing around the opening, said diaphragm in vibratory association with the one or more acoustically responsive elements wherein said acoustically responsive element has opposing parallel first and second faces, said first face being in contact with said diaphragm, and said second face being in contact with a rigid inner partition wall fixed in said housing.

2. The transducer apparatus of claim 1, wherein said one or more acoustically responsive elements are one or more sectionalized vibratory elements.

3. The transducer apparatus of claim 2, wherein an increase in the ratio of the surface area of the diaphragm to the one or more sectionalized vibratory elements end surface area produces a gain in the sensitivity of the one or more sectionalized vibratory elements.

4. The transducer apparatus of claim 1, wherein the diaphragm has a thickness and diameter adapted to produce vibrations between 20 Hz and 20 KHz.

5. The transducer apparatus of claim 1, wherein the one or more acoustically responsive elements comprise a single ceramic disk.

6. The transducer apparatus according to claim 1, wherein said housing is a metallic housing.

7. The transducer apparatus according to claim 1, wherein said one or more acoustically responsive elements comprise a plurality of stacked ceramic disks.

8. The transducer apparatus according to claim 1, wherein a peripheral outer edge of said diaphragm contacts the outer edge of said housing, whereby a gap between the housing and diaphragm is eliminated.

9. The transducer apparatus of claim 1, wherein the housing has a surface edge formed as a knife edge for contacting the diaphragm.

10. The transducer apparatus of claim 1, wherein the diaphragm has a plurality of contact points with the housing.

11. The transducer apparatus of claim 1, wherein the diaphragm is formed from a conic section.

12. The transducer apparatus of claim 1, wherein the diaphragm is formed from a polygon section.

13. The transducer apparatus of claim 1, wherein said diaphragm has a peripheral flange, substantially transverse to the plane of the diaphragm, said flange in contact with an outer surface of said housing.

14. The transducer apparatus of claim 1, wherein the outermost portion of the housing is curved.

15. The transducer apparatus of claim 1, wherein the outermost portion of the housing is planar.

16. The transducer apparatus of claim 1, wherein an area of said diaphragm is greater than an area of a face of said acoustically responsive element in contact with said diaphragm.

17. An acoustic pressure sensor, comprising:
- a longitudinal tubular member symmetrically disposed about a central axis and having an internal hollow and having an opened top;
- at least one acoustically responsive element located in said hollow near said open top;
- a flexible diaphragm covering said open top and in contact with said at least one acoustically responsive element and an outermost peripheral edge of said tubular member, said diaphragm flexing upon application of an acoustic pressure thereto to apply said pressure to said at least one acoustically responsive element wherein said acoustically responsive element has opposing parallel first and second faces, said first face being in contact with said diaphragm, and said second face being in contact with a rigid inner partition wall fixed in said housing.

18. The acoustic pressure sensor according to claim 17, wherein said longitudinal tubular member is circular in cross section and fabricated from a metal.

19. The acoustic pressure sensor according to claim 18, wherein said metal is titanium.

20. The acoustic pressure sensor according to claim 17, wherein said at least one acoustically responsive element comprises a stack of piezoelectric elements.

21. The acoustic pressure sensor according to claim 20, wherein said piezoelectric elements are ceramic elements.

22. The acoustic pressure sensor according to claim 17, wherein said flexible diaphragm includes a central boss portion, said diaphragm having a peripheral flange, said flange encircling a top portion of said tubular member when said diaphragm covers said opened top.

23. The acoustic pressure sensor according to claim 22, wherein said central boss portion is located along a central axis surrounded by said tubular member.

24. The acoustic pressure sensor according to claim 23, wherein said at least one acoustically responsive element comprises an annular stack of one or more piezoceramic discs disposed about said central axis.

25. The acoustic pressure sensor according to claim 24, further including a torquable rod directed through a central aperture of said annular stack and having a surface in said central aperture of said boss, to apply a torque to said diaphragm structure to close any gap between said diaphragm structure and said stack.

26. The acoustic pressure sensor according to claim 17, further including signal conditioning circuitry located within said internal hollow of said tubular member and operatively coupled to said at least one acoustically responsive element for amplifying signals produced by said at least one element.

27. The acoustic pressure sensor according to claim 17, wherein said flexible diaphragm is fabricated from a metal.

28. The acoustic pressure sensor according to claim 27, wherein said flexible diaphragm is welded to said tubular member.

29. The pressure sensor of claim 17, wherein said diaphragm has a peripheral flange, substantially transverse to the plane of the diaphragm, said flange in contact with an outer surface of said tubular member.

30. The pressure sensor of claim 17, wherein the outermost peripheral edge of said tubular member has a surface formed as a knife edge, the diaphragm in contact with the knife edge.

31. The pressure sensor of claim 17, wherein the outermost peripheral edge of said tubular member has a curved surface.

32. The pressure sensor of claim 17, wherein the outermost peripheral edge of said tubular member has a planar surface.

33. A hydrophone receiver comprising a cylindrical housing containing at least one acoustically responsive element positioned longitudinally along a central axis of the housing; the housing having an opening centered on the central axis; a substantially planar diaphragm in contact with said housing along an outermost peripheral portion of said housing around said opening, said diaphragm in vibratory association with the at least one acoustically responsive element, wherein said diaphragm has a relative stiffness substantially less than the stiffness of the peripheral portion of the housing and of the at least one acoustically responsive element wherein said acoustically responsive element has opposing parallel first and second faces, said first face being in contact with said diaphragm, and said second face being in contact with a rigid inner partition wall fixed in said housing.

34. The hydrophone receiver according to claim 33, wherein the relative stiffness is on the order of equal to or greater than one hundred to one.

35. The hydrophone receiver according to claim 33, wherein the outermost peripheral portion of the housing has a beveled edge which terminates at an apex, said diaphragm in contact engagement with said housing at said apex.

36. The hydrophone receiver according to claim 33, wherein the outermost peripheral portion of the housing has a substantially planar outer edge surface, said diaphragm in contact engagement with said housing at said planar outer edge surface.

37. The hydrophone receiver according to claim 33, wherein the outermost peripheral portion of the housing has a curved outer edge surface, said diaphragm in contact engagement with said housing at a portion of said curved outer edge surface.

38. The hydrophone receiver of claim 33, wherein said diaphragm has a peripheral flange, substantially transverse to the plane of the diaphragm, said flange in contact with an outer surface of said housing.

* * * * *